Oct. 2, 1945.   H. McCUTCHAN   2,386,131
COOK BOOK HOLDER
Filed May 13, 1944

INVENTOR.
HELEN McCUTCHAN.
BY
ATTORNEY

Patented Oct. 2, 1945

2,386,131

UNITED STATES PATENT OFFICE 2,386,131

COOKBOOK HOLDER

Helen McCutchan, Detroit, Mich.

Application May 13, 1944, Serial No. 535,568

2 Claims. (Cl. 45—58)

This invention relates to book holders being particularly useful for cook books, the object being to provide a simple and comparatively inexpensive structure for mounting of a surface above a table or other element where the cook is preparing or assembling the ingredients of a food, as for instance in the kneading of dough for the baking of bread, or in assembling the elements in the preparation of a food.

In the preparation of food composed of various ingredients the housewife or chef is required to assemble the various ingredients and by having the open book above the table or device on which the articles are to be assembled, the recipe for assembling the ingredients is at the point of assembly and thus saves considerable time on the part of the cook.

In its preferred form my improved book holder comprises a body or plate 1 of rectangular form and of a desired dimension and is here shown as being made of a rectangular sheet of metal but may be made of other material as may be desired without departing from the spirit and scope of the invention disclosed herein.

The plate 1 in its preferred form has a return bent portion providing an abutment 2 at its lower transverse edge which is adapted to prevent the book from sliding from the plate when lying at an angle to a horizontal plane.

Figure 2:
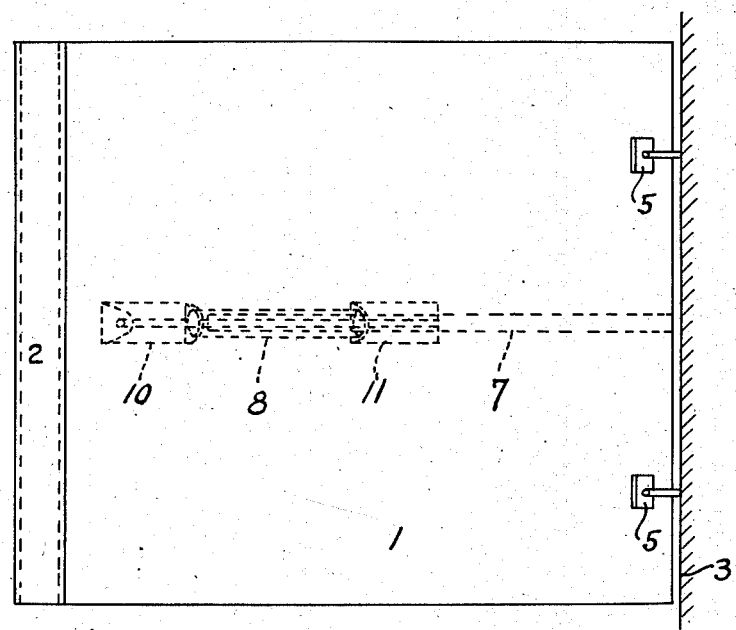
Fig. 2 is a plan view thereof.
Figure 1:
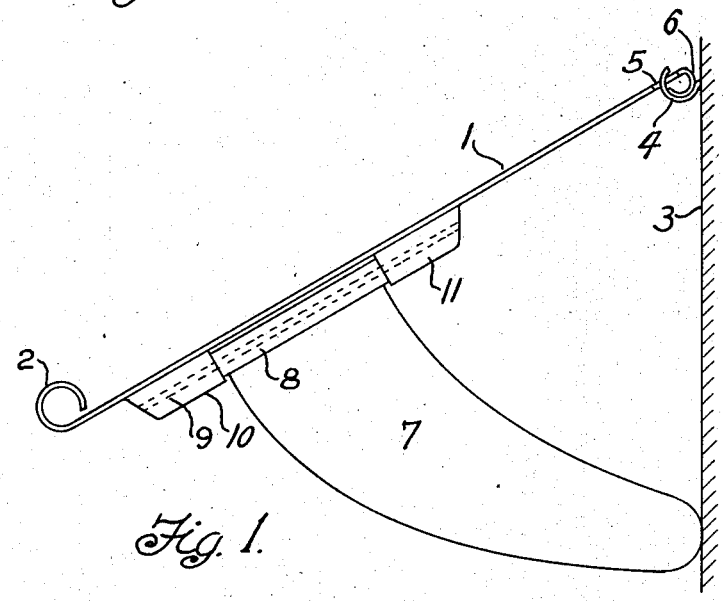
Fig. 1 is a side elevation of my improved book holder.

At its opposite end the plate is pivotally attached to the wall indicated at 3 and in the preferred form I provide a hook element 4 having an end portion secured in the wall and the outer edge of the hook extends through a slot 5 adjacent the opposite side edges of the plate 1 as shown in Fig. 2. The upper terminal end of the plate 1 has an inturned edge 6 which fits in the arc of the hook element 4 which acts as the stationary element of a hinge. On the under side of the plate 1 is a brace member 7 comprising a plate of sheet form having a rolled edge 8 to receive a shaft, indicated by dotted lines 9, having its opposite end extending through the respective ears 10 and 11 each formed to receive the respective ends of the shaft. The brace member 7 is foldable on the shaft 9 as an axis to a position practically in contact with the under side of the plate 1 and thus permits the plate 1 to be turned to a position substantially parallel with the wall when not required for use.

Due to the fact that the ears 10 and 11 are of a width substantially equal to or less than the extent to which the hook 4 projects from the wall, the supporting plate 1 lies substantially parallel with the wall when the member 7 is folded to a position parallel with the plate.

It is likewise to be noted that the slot or eye 5 for each of the hook elements is so formed that the plate 1 and attached parts may be removed therefrom when not in use.

It is believed evident from the foregoing description that my improved book holder is simple and inexpensive in character and construction and that the various features and objects of the invention are attained by the structure described and that various changes may be made without departing from the spirit and scope of the invention as set forth in the appended claims.

Having thus briefly described my invention, its utility and mode of operation, what I claim and desire to secure by Letters Patent of the United States is:

1. A device for the purpose described comprising a body member formed of a flat metal sheet having one edge return bent to form a circular abutment, and the opposite edge being reversely folded, said sheet having openings adjacent the last named edge, and a hook element for each opening secured to a vertical surface having the free end thereof extending through the respective opening in the plate and being of an arcuate form to provide a seat for the said reversely folded edge of the plate adjacent thereto, and means pivoted to the under surface of the sheet adapted to support the plate at an angle to a horizontal plane, said means being foldable to practically parallel relation with the sheet to thereby permit the sheet to lie practically parallel with the vertical surface.

2. A device for the purpose described comprising a body member formed of a flat metal sheet having one edge return bent to form an abutment, and the opposite edge being reversely bent to form a semi-circular edge portion, a hook element secured in a wall surface having a curved part in which the last named curved portion of the metal sheet seats, the metal sheet having an aperture adjacent the last named curved edge thereof through which the end of the hook may project, a brace member, formed of sheet material provided at one end with a tubular portion, said plate having spaced eyed portions between which the tubular portion of the brace member is positioned, a shaft extending through the tubular portion of the sheet and said eyed portions of the plate providing a relationship of parts permitting the sheet to assume a position parallel with the wall surface, and further being turnable at a right angle to the sheet to support the same by contact with the wall surface to thereby support the sheet at a desired angle to the verical.

HELEN McCUTCHAN.